United States Patent
Gasvoda

(12) 
(10) Patent No.: US 6,770,206 B2
(45) Date of Patent: Aug. 3, 2004

(54) METHOD AND APPARATUS FOR HANDLING LIQUID WASTE IN A WET-WELL

(75) Inventor: Michael S. Gasvoda, Schererville, IN (US)

(73) Assignee: Gasvoda & Associates, Inc., Calumet City, IL (US)

(*) Notice: Subject to any disclaimer, the term of this patent is extended or adjusted under 35 U.S.C. 154(b) by 45 days.

(21) Appl. No.: 10/192,107

(22) Filed: Jul. 10, 2002

(65) Prior Publication Data
US 2004/0007537 A1 Jan. 15, 2004

(51) Int. Cl.[7] .................................................. C02F 1/00
(52) U.S. Cl. ...................... 210/744; 210/747; 210/104; 210/139; 210/170; 210/220; 210/920
(58) Field of Search ................................ 210/620, 747, 210/718, 170, 220, 138, 139, 920, 104, 744

(56) References Cited

U.S. PATENT DOCUMENTS

| | | | |
|---|---|---|---|
| 981,098 A | | 1/1911 | McCaskell |
| 1,309,267 A | | 7/1919 | Westad et al. |
| 1,963,354 A | * | 6/1934 | Currie .......................... 210/758 |
| 3,054,602 A | | 9/1962 | Proudman |
| 3,405,920 A | | 10/1968 | Lefrancois |
| 3,525,685 A | * | 8/1970 | Edwards ....................... 210/620 |
| 3,734,850 A | * | 5/1973 | Karr .............................. 210/220 |
| 3,875,051 A | * | 4/1975 | Kovarik ........................ 210/170 |
| 3,957,633 A | * | 5/1976 | Gatti et al. ................... 210/220 |
| 3,959,142 A | * | 5/1976 | Dupre ........................... 210/170 |
| 4,115,258 A | * | 9/1978 | Smith et al. ................. 210/620 |
| 4,193,873 A | * | 3/1980 | Thrasher ....................... 210/170 |
| 4,340,473 A | | 7/1982 | Lindman et al. |
| 4,594,153 A | * | 6/1986 | Weis ............................. 210/170 |
| 4,842,732 A | | 6/1989 | Tharp |
| 5,433,854 A | * | 7/1995 | Dickerson .................... 210/620 |
| 5,444,887 A | | 8/1995 | Rufolo |
| 5,507,946 A | | 4/1996 | Stearns |
| 5,921,316 A | | 7/1999 | McMinn |
| 5,928,615 A | | 7/1999 | Strock et al. |
| 6,086,658 A | | 7/2000 | Gohara et al. |
| 6,284,138 B1 | * | 9/2001 | Mast ............................. 210/170 |

* cited by examiner

Primary Examiner—Christopher Upton
(74) Attorney, Agent, or Firm—Welsh & Katz, Ltd.

(57) ABSTRACT

An apparatus for preventing formation of a solid or semi-solid surface layer in liquid waste contained in a wet-well includes an air pump adapted to pump air into the wet-well and an air pump controller configured to activate and deactivate the air pump at selected times. Also included are a plurality of air injectors disposed in the wet-well and operatively coupled to the air pump. The air injectors inject the air into the liquid waste causing a stream of air bubbles to rise in the liquid waste. The air pump controller activates the air pump for a predetermined period of time so that the stream of air bubbles produced within the liquid waste causes turbulence within the liquid waste so as to disrupt and break up solids or semi-solids on a surface of the liquid waste to prevent the formation of the solid or semi-solid surface layer.

20 Claims, 4 Drawing Sheets

METHOD AND APPARATUS FOR HANDLING LIQUID WASTE IN A WET-WELL

FIELD OF THE INVENTION

The present invention relates generally to a method and apparatus for handling liquid waste, and more specifically to a method and apparatus for preventing the formation of a solid or semi-solid layer on the surface of liquid waste contained in a wet-well.

BACKGROUND

Wet-wells are closed holding tanks for liquid waste products. Wet-wells are typically formed of concrete or fiberglass and are generally buried or have a substantial portion disposed below ground level. In residential use, several homes or subdivisions may be connected to a single wet-well depending upon the size and capacity of the wet-well. Often, in commercial use, several commercial establishments are connected to a single wet-well. The wet-well receives liquid waste, rain run-off, sewage, surfactants, and any other waste products that a home or establishment "flushes" down a drain.

Wet-wells may also be part of a sewer collection system where a plurality of wet-wells, possibly of differing sizes, are connected to each other in various configurations The final destination of the liquid waste in the sewer collection system is the municipal sewage treatment facility.

Unfortunately, waste products that ought not enter the drainage system are nonetheless discarded inappropriately. For example, restaurants are not permitted to flush waste cooking oil and grease down the drain, but some establishments do so in contravention of local ordinances. Such waste products combine with other waste products and tend to form a solid or semi-solid layer on the surface of the liquid waste in the wet-well. It has been found by observation that in some wet-well systems, such a solid or semi-solid layer may be two feet thick or greater. This causes failure of the wet-well function and necessitates costly repair and maintenance. Accordingly, it is desirable to have a method and apparatus that prevents the formation of a solid or semi-solid layer on the surface of the liquid waste in the wet-well.

SUMMARY

The disadvantages of present sewer collection system wet wells are substantially overcome with the present invention by providing a novel method and apparatus for handling liquid waste in the receiving wet-well.

More specifically, one embodiment of the present invention for preventing formation of a solid or semi-solid surface layer in liquid waste contained in a wet-well includes an air pump adapted to pump air into the wet-well and an air pump controller configured to activate and deactivate the air pump at selected times. Also included are a plurality of air injectors disposed in the wet-well and operatively coupled to the air pump. The air injectors inject air into the liquid waste causing a stream of air bubbles to rise in the liquid waste. The air pump controller activates the air pump for a predetermined period of time so that the stream of air bubbles produced within the liquid waste causes turbulence within the liquid waste so as to disrupt and break up solids or semi-solids on a surface of the liquid waste to prevent the formation of the solid or semi-solid surface layer.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 1:
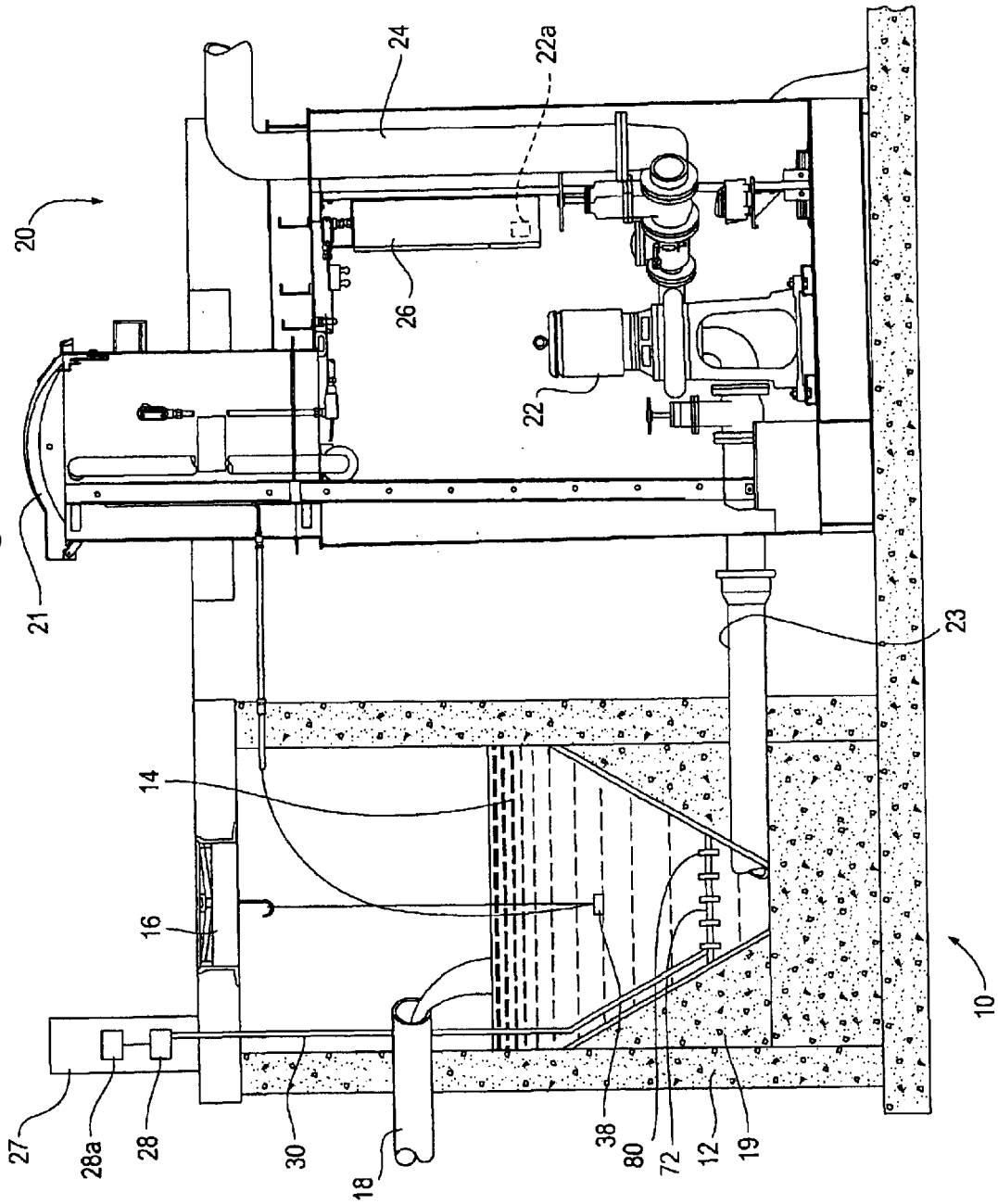
FIGS. 1–2 are side elevational views of specific embodiments of wet-well systems according to the present invention.

Referring now to FIG. 1, a sewer collection system 10 is shown generally. The sewer collection system 10 includes a holding tank, referred to as a wet-well 12, which is adapted to accumulate liquid waste 14, such as the various waste products described above. Construction of the wet-well 12 is known in the art. Wet-wells 12 are typically constructed of concrete or fiberglass and are disposed below ground level with an access hatch 16 typically located at ground level or just above. Wet-wells 12 may be constructed in virtually any size, with typical wet wells ranging from four to ten feet in diameter and six to thirty feet deep. To increase structural integrity, an interior bottom portion of the wet-well may be angled or have a chamfer 20. The chamfer may also aid in the turbulent circulation of the liquid waste in the wet-well 12, as described below.

The wet-well 12 is designed for a certain capacity or volume, but in practice, the liquid waste 14 is permitted to accumulate only up to a certain level, for example, ten to twenty percent of the maximum capacity of the wet-well volume. However, any suitable percentage of capacity may be selected as the maximum permitted volume of liquid waste 14. The liquid waste 14 enters the wet-well 12 through an inlet pipe 18, the position of which with respect to the height of the wet-well may not be drawn to scale in FIG. 2. Once the maximum permitted level of liquid waste 14 has accumulated, some of the liquid waste is pumped out of the wet-well 12.

In some facilities, a "pumping station" 20 may be located next to the wet-well 12. The pumping station 20 may be an underground chamber or "dry pit" having an access hatch 21 to permit access to the pumping station. A liquid pump 22 may be mounted on the floor of the dry pit 20 along with associated piping and valves. Alternatively, the liquid pump 22 may be an above-ground vacuum-primed liquid pump, a submersible pump, or any suitable liquid pump, as is known in the art. A pumping pipe 23 is connected between the wet-well 12 and the liquid pump 22 to permit the liquid waste 14 to be pumped out of the wet-well. The liquid waste 14 may then be pumped to another "downstream" wet-well in the collection system, a force-main, a gravity main, or directly to the municipal sewage treatment facility via an outlet pipe 24.

The liquid pump 22 may be controlled by a liquid pump controller 22a configured to activate the liquid pump 22 at the appropriate times upon receipt of a liquid pump activation signal. The liquid pump controller 22a may be housed in a dry pit control panel 26. A second control panel or wet-well control panel 27 may control functions associated with the pumping of air into the wet-well 12, and thus may house an air pump 28 and an air pump controller 28a.

Either or both of the control panels 26, 27 may contain one or more controllers. For example, although the dry pit control panel 26 preferably houses the liquid pump controller 22a, while the wet-well control panel 27 preferably houses the air pump controller 28a, each control panel may contain additional controllers. In such a configuration, wiring preferably connects the two controllers 22a, 28a to coordinate operation of the system.

While the dry pit control panel 26 is preferably located in the dry pit 20, and the wet-well control panel 27 is preferably located adjacent the wet-well, either control panel may be located any suitable distance from the dry pit 20 or the wet-well 12, respectively. The location of the control panels 26, 27 depends upon the physical site and the wiring and tubing coupling the controllers 22a, 28a to the dry pit 20 and the wet-well 12, respectively. The wiring and tubing are preferably located underground, but may also be above ground.

The controllers 22a, 28a may be microprocessors or computer controlled devices, or may be constructed from discrete components, as is known in the art. The controllers 22a, 28a may alternatively be mechanical or electrical automatic timing systems operating without software control.

As described above, the air pump 28 is preferably located in the wet-well control panel 27. The air pump 28, may be, for example, an air compressor system (used interchangeably with an "air pump") adapted to pump air into the liquid waste 14. As is known in the art, the air compressor system 28 may include a compressor motor and a tank to hold the compressed air. The air pump 28 is controlled by the air pump controller 28a.

Preferably, the air pump or air compressor system 28 and the air pump controller 28a are physically located in the wet-well control panel 26 so as to minimize the number of connections and the length of such connections. A suitable air pipe or tubing 30 routes the air pumped from the air pump 28 to the wet-well 12, as will be described below. Preferably, the air pipe 30 extends along the inside walls of the wet-well 12. The connection or air pipe 30 between the air pump 28 and the wet-well 12 is not shown in FIG. 2 for purposes of clarity only.

Figure 2:
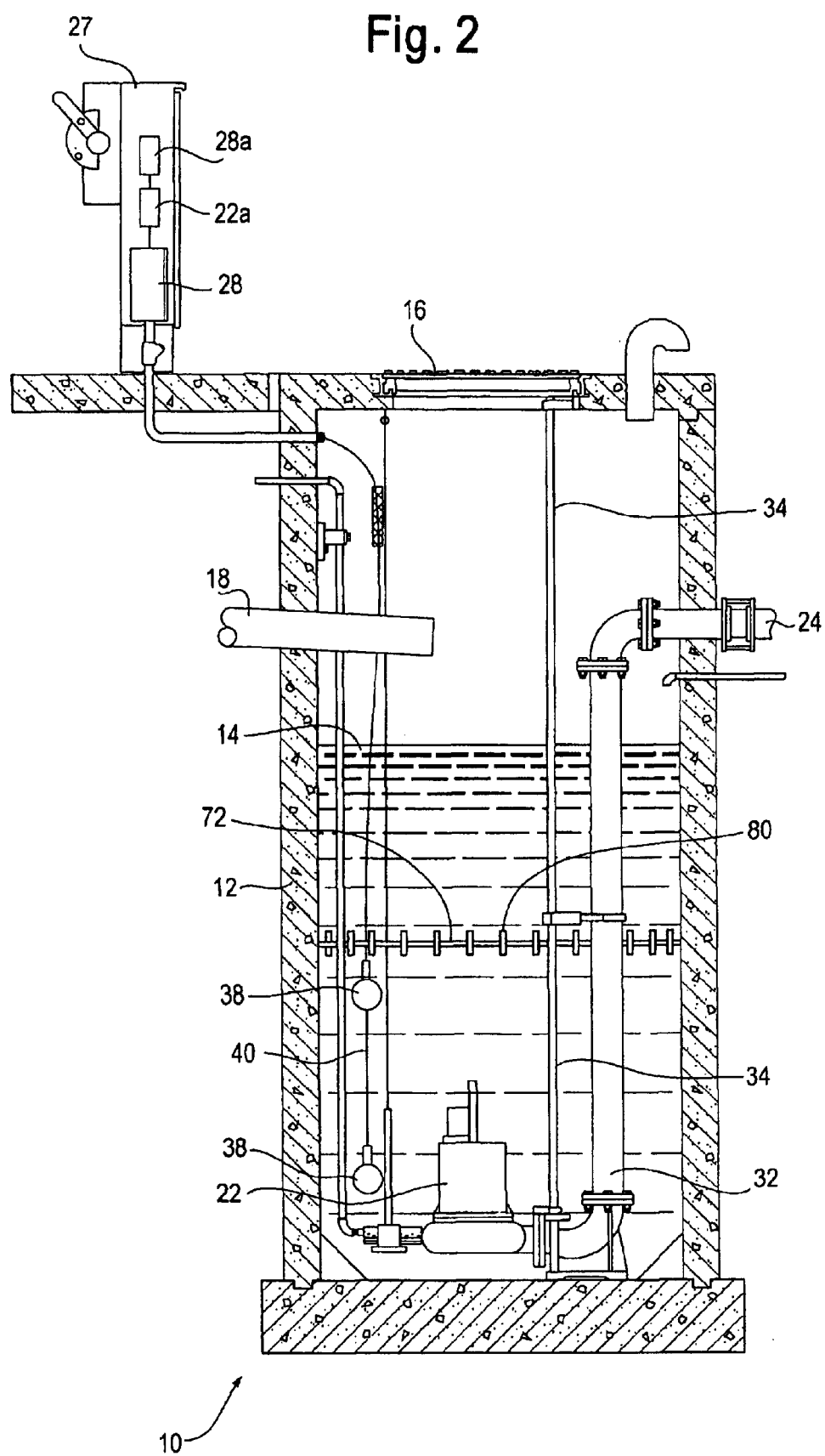
Figure 3:
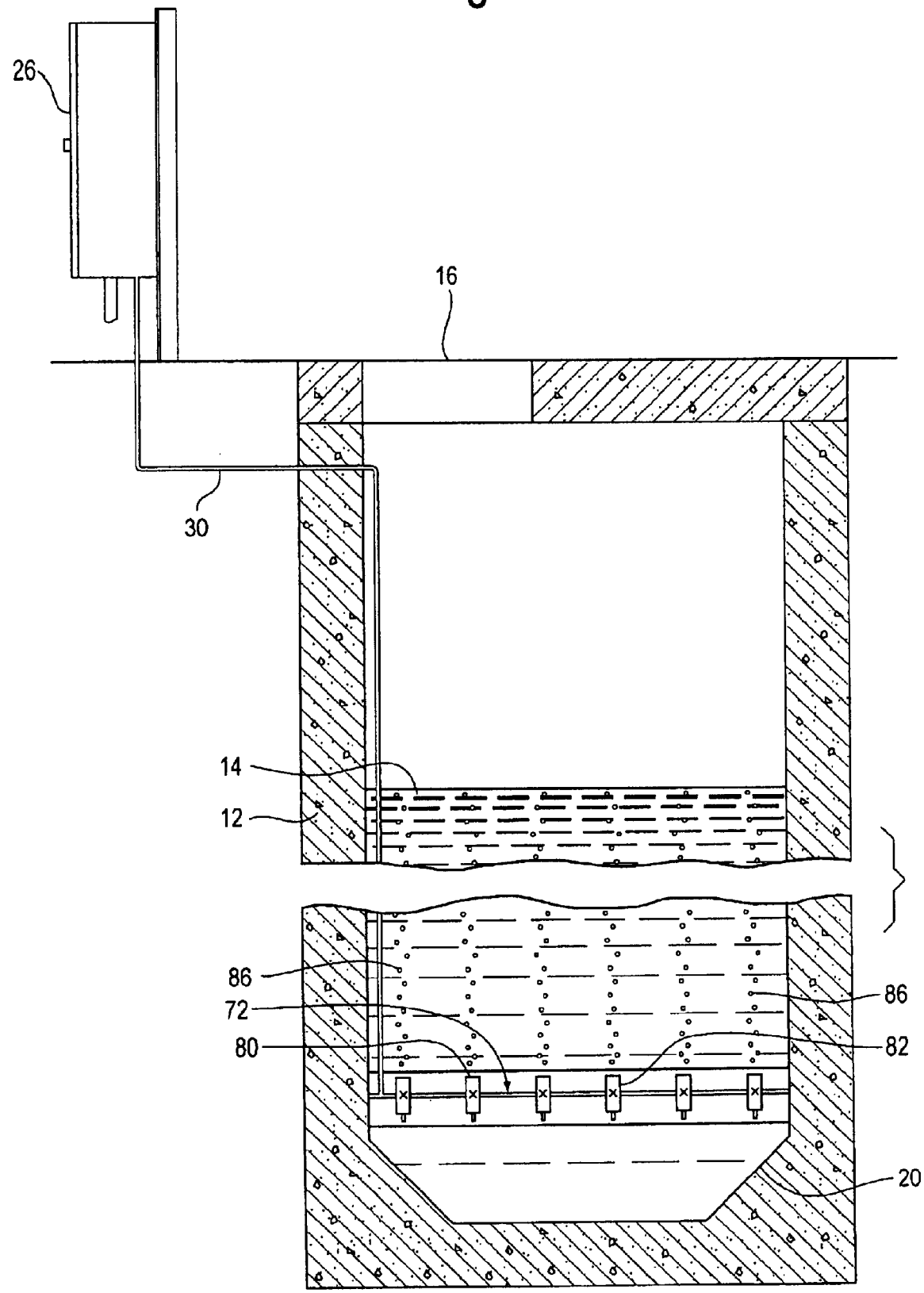
FIG. 3 is an enlarged side elevational view of a specific embodiment of a wet-well showing an air distribution system according to the present invention.

With respect to the basic wet-well configuration, alternatively, the liquid pump 22 need not necessarily be housed in the dry pit 20 of FIG. 1. Referring now to FIGS. 1 and 2, FIG. 2 shows a configuration where the liquid pump 22 is located toward the bottom of the wet-well 12 and the controllers 22a and 28a may both be housed in the wet-well control panel 27. In this embodiment, no dry pit is provided and the liquid pump 22 is submerged in the liquid waste 14. Provisions are made to permit maintenance and removal of the liquid pump 22 should it become necessary. In that regard, the liquid pump 22 may be disconnected from the its mount and from an outlet pipe 32 by means of guide rails 34 accessible from the hatch 16, as is known in the art. This permits the liquid pump 22 to be raised out of the wet-well 12 for maintenance if necessary.

Regardless of the location of the liquid pump 22 and the air pump 28, the air pump is configured to inject air into the liquid waste 14 in the wet-well 12 under control of the air pump controller 28a and upon receipt of an air pump activation signal. The liquid pump controller 22a may activate the liquid pump 22 when the level of the liquid waste 14 in the wet-well 12 reaches a predetermined height. Accordingly, a sensor or liquid level indicator may be used to inform the liquid pump controller 22a. Preferably a "float" 38 or similar device is used to inform the liquid pump controller 22a that the level of the liquid waste 14 has reached a certain height.

The sensor 38 may be in the form of an electrical contact switch, a float or other buoyant indicator, an electrical conductivity sensor, an ultrasonic sensor, a radio frequency emitter, and the like. Any suitable liquid level or proximity sensor may be used. Preferably, a wire 40 connects the sensor or float 38 with the liquid pump controller 22a.

Figure 4:
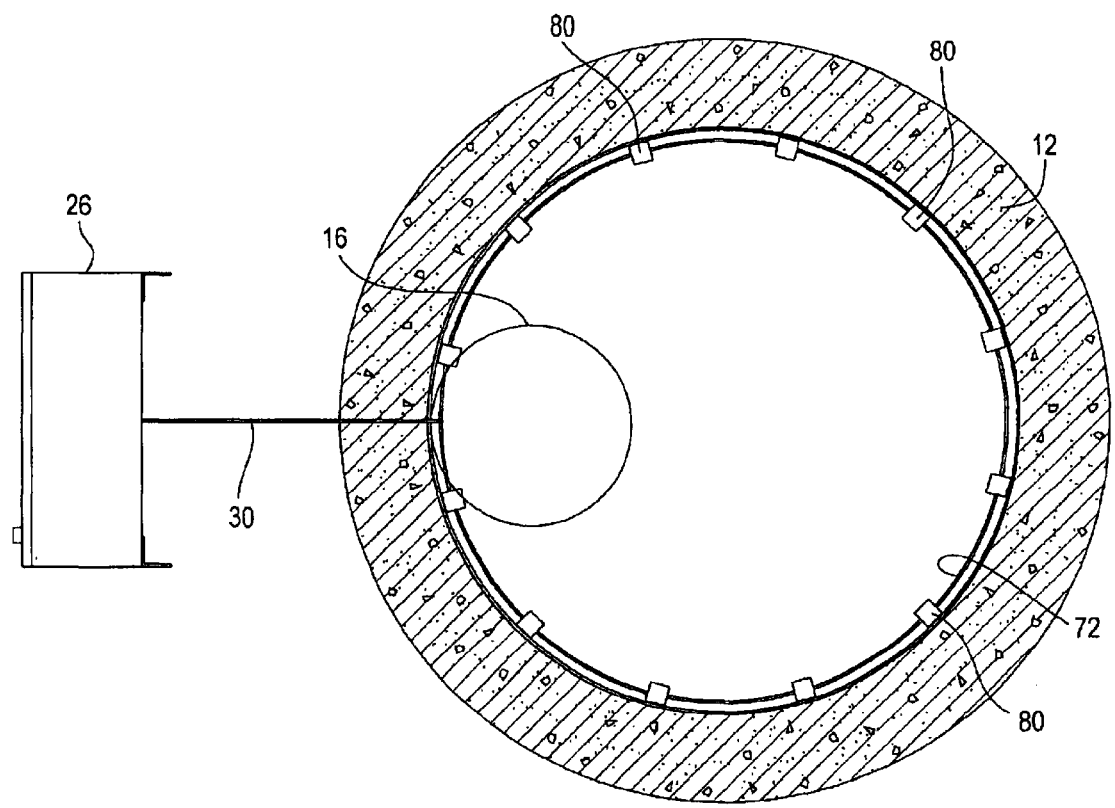
FIG. 4 is a top plan view of the wet-well of FIG. 3.

At a position just above the bottom portion of the wet-well 12, the air tube 30 (not shown in FIG. 2) is coupled to an air distribution ring 72, which has a circumference just smaller than the inside diameter of the wet-well. Referring to FIGS. 1–4, FIGS. 3–4 show greater detail of the air distribution ring, which detail is not shown in FIGS. 1–2 for purposes of clarity only. Conversely, FIGS. 3–4 do not show the detail of the pumps and piping, for purposes of clarity only. The air distribution ring 72 may be secured to the inside surface of the wet-well 12 by suitable connectors, as is known in the art, such as by concrete nails, screws, or other fastening devices. The air distribution ring 72 may also be supported by the bottom surface of the wet-well 12. A plurality of injectors or nozzles 80 are coupled to the air distribution ring 72. As shown in FIG. 4, twelve injectors 80 are illustrated, but any suitable number of injectors may be coupled to the air distribution ring 72. Each injector 80 is preferably coated with a protective layer, such as epoxy, to resist corrosion. Each injector 80 further includes a check-valve 82 to prevent the liquid waste 14 from entering the injector and traveling through the air distribution ring 72. Air is injected via the air pump 22 under high pressure, for example between 90 and 125 pounds per square inch.

The injectors 80 are preferably evenly spaced about the inner circumference of the wet-well 12 and may be directed radially inwardly toward the center of the wet-well, or may point vertically downward from the air distribution ring 72. However, the injectors 80 may point in any direction because they are preferably mounted to permit the direction in which they point to be modified. For example, the injectors 80 may have a swivel-type mount. However, any suitable mounting mechanism may be used. This may be helpful in preventing snagging of the injectors 80 when other hardware, such as sidewall ladders, are in close proximity to the air distribution ring 72 or the injectors. Such swiveling injectors 80 may also avoid snagging the submerged liquid pump 22 of FIG. 2 if it is raised out of the wet-well 12 for maintenance.

Formation of a solid or semi-solid layer or "crust" on the surface of the liquid waste 14 may foul the normal operation of the wet-well 12, and may necessitate expensive repairs, as mentioned above. Such a surface layer tends to form naturally due to the nature of the various types of waste matter introduced into the system, and further develops because of the unsuitable material improperly directed into the system, where such introduction of unsuitable material is difficult or impossible to prevent. Various chemical and physical remedies may be employed to attempt to eliminate the surface layer once formed, but a proactive solution of preventing the formation of the surface layer is a superior, safer and more cost-efficient approach.

To prevent the formation of the undesirable solid or semi-solid surface layer, the air pump controller 28a activates the air pump 28. Of course, there must be some communication between the two controllers 22a, 28a so that the activation sequence of the air pump 28 and the liquid pump 22 is coordinated. Activation of the air pump 28 causes air to be injected into the injectors 80 causing air bubbles 86 or an air stream to rise within the liquid waste 14. Because the air is injected under high pressure, the air stream cause extreme agitation and turbulence of the liquid waste. The air stream 86 rise along the sidewall of the wet-well 12 and eventually reaches the surface of the liquid waste 14. The turbulence of the rising air bubbles 86 interacts with the solids or semi-solids in the liquid waste 14 and prevents the formation of a surface crust or skin. The action of the air bubbles 86 or air stream disrupts and breaks up the solid or semi-solid material tending to form a skin or crust on the surface of the liquid waste 14. The air bubbles 86 cause the solids or semi-solids to remain in suspension within the liquid waste 14, and such solids or semi-solids tend to move toward the center of the surface of the liquid waste and then down toward the bottom of the wet well 12. Thus, the solids or semi-solid material does not get a chance to form any type of surface layer.

Of course, it is not necessary to constantly provide air bubbles 86 to prevent formation of the surface layer. Periodic production of air bubbles 86 is sufficient. Because the air bubbles 86 cause the solids and semi-solid material to remain in suspension within the liquid waste, such solid and semi-solid material may pumped out of the wet-well 12 along with a portion of the liquid waste 14 when the liquid pump 22 is activated. In that regard, production of the air bubbles 86 is preferably performed just prior to activation of the liquid pump 22.

However, prior to activating the liquid pump 22, it may be necessary to wait for a predetermined period of time after the air pump 28 has been deactivated so that the air bubbles 86 dissipate and do not enter the liquid pump.

Preferably, according to one specific embodiment, the air pump 28 may be preferably activated for a period of time of about seven seconds, which may occur every twenty minutes. The activation time may be increased for larger wet-wells. After the air pump 28 has been turned off, and has remained off for between one and three seconds, the liquid pump 22 is then activated. In this specific embodiment, activation and deactivation of the air pump 28 is followed by activation of the liquid pump Any suitable duty cycle and activation time may be used, depending upon the application and the dimensions of the wet-well 12. For example, in a very small wet-well, the air pump 28 may be activated for a duration of between three and ten seconds, prior to liquid pump activation. In a very large wet-well, the air pump may be activated for a duration of between seven and thirty seconds, prior to liquid pump activation. The time between deactivation of the air pump 28 and activation of the liquid pump 22 may range from between one and five seconds, of course, depending upon the size of the wet-well.

However, the liquid pump 22 need not be activated after each and every activation of the air pump 28. For example, if the level of the liquid waste 14 in the wet-well 12 is below the maximum level, as detected by the sensor 38, the liquid pump 22 need not be activated. But to prevent the formation of the solid or semi-solid surface layer, the air pump 28 is periodically activated regardless of whether the liquid pump 22 is or is not activated. Thus, the air pump 28 may be activated sequentially without intervening activation of the liquid pump 22. However, the above-described ranges for the activation times of the pumps and the duration of time from deactivation of the air pump 28 until activation of the liquid pump 22 may be significantly expanded without departing from the scope of this invention. For example, a minimum value may be reduced by a factor or three and a maximum value may be increased by a factor of three.

Specific embodiments of an apparatus for preventing formation of a solid or semi-solid surface layer in liquid waste contained in a wet-well according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. An apparatus for preventing formation of a solid or semi-solid surface layer in liquid waste contained in a wet-well, the apparatus comprising:

a liquid pump adapted to pump the liquid waste out of the wet-well;

an air pump adapted to pump air into the wet-well;

one or more controllers configured to activate and deactivate the liquid pump and the air pump at selected times;

a plurality of air injectors disposed in the wet-well and operatively coupled to the air pump, the air injectors injecting air into the liquid waste causing a stream of bubbles of air to rise in the liquid waste;

the controller activating the air pump for a predetermined period of time so that the stream of air bubbles produced within the liquid waste causes turbulence in the liquid waste so as to disrupt and break up solids or semi-solids on a surface of the liquid waste to prevent the formation of the solid or semi-solid surface layer; and the controller activating the liquid pump for a predetermined period after deactivation of the air pump to cause a portion of the liquid waste and the solids or semi-solids to be pumped out of the wet-well.

2. The apparatus according to claim 1 further including a sensor configured to notify the controller when the level of the liquid waste reaches a predetermined level in the wet-well.

3. The apparatus according to claim 2 wherein the sensor is selected from the group of sensors consisting of a float, electrical contact switch, buoyancy indicator, electrical conductivity sensor, ultrasonic sensor, and radio frequency emitter.

4. The apparatus according to claim 1 wherein the controller is located remotely from the wet-well.

5. The apparatus according to claim 1 wherein the controller and the air pump are incorporated into a common enclosure.

6. The apparatus according to claim 1 wherein the liquid pump is a submersible pump.

7. The apparatus according to claim 1 wherein the air pump injects air into the wet-well under high pressure, said pressure between about 50 PSI and 125 PSI.

8. The apparatus according to claim 1 wherein the plurality of air injectors are disposed proximal a bottom portion of the wet-well and are arranged about an inner circumference of the wet-well.

9. The apparatus according to claim 1 wherein the plurality of air injectors are arranged at substantially equal angular intervals about an inner circumference of the wet well.

10. The apparatus according to claim 1 wherein each air injector further includes a check-valve to prevent backflow of the liquid waste through the air injector.

11. The apparatus according to claim 1 wherein each air injector is coated with a protective layer to prevent corrosion.

12. The apparatus according to claim 1 wherein each air injector is mounted on a movable mount to permit a directional orientation of the air injector to be changed.

13. The apparatus according to claim 1 further including means for directing the bubbles emitted by the air injectors so that said bubbles flow upward along sidewalls of the wet-well causing the solid or semi-solid material in the liquid waste to move toward a center of the surface of the liquid waste and then downward from the surface of the liquid waste toward a bottom portion of the wet-well, the solid or semi-solid material remaining in suspension in the liquid waste.

14. The apparatus according to claim 1 further including means for deactivating the air pump for a predetermined period of time prior to activation of the liquid pump.

15. The apparatus according to claim 1 further including means for controlling cycling of the liquid pump so that the liquid pump is not activated until the air pump has been deactivated for a predetermined period of time to prevent the air bubbles from entering the liquid pump.

16. The apparatus according to claim 1 further including means for controlling the air pump so that the air pump is activated for a period of time ranging between seven seconds and thirty seconds, said activation of the air pump occurring with a frequency of about between one and ten times per hour.

17. The apparatus according to claim 1 further including means for controlling the air pump and the liquid pump so that after the controller receives a signal indicating that the liquid waste has reached a predetermined level within the wet-well, the air pump is activated for a period of between seven and thirty seconds and wherein the liquid pump is not activated until about between one and three seconds after deactivation of the air pump.

18. The apparatus according to claim 1 further including means for controlling the air pump so that the air pump is activated a plurality of times without an intervening activation of the liquid pump.

19. An apparatus for preventing formation of a solid or semi-solid surface layer in liquid waste, the apparatus comprising:

a wet-well for accumulating the liquid waste;

a controller responsive to a liquid level signal indicating that a level of the liquid waste has reached a predetermined height within the wet-well, the controller configured to provide a liquid pump activation signal and an air pump activation signal;

a liquid pump responsive to the liquid pump activation signal and configured to pump the liquid waste out of the wet-well;

an air pump responsive to the air pump activation signal and configured to pump the air into the liquid waste;

a plurality of air nozzles disposed in a bottom portion of the wet-well and operatively coupled to the air pump, the air nozzles configured inject air streams into the liquid waste so as to produce a turbulent rotation of the liquid waste;

the controller activating the air pump for a predetermined period of time after receiving the liquid level signal, the air streams produced within the liquid waste configured to disrupt and break up accumulated solids on a surface of the liquid waste to prevent the formation of the solid or semi-solid surface layer; and the controller activating the liquid pump for a predetermined period of time after deactivation of the air pump to cause a portion of the liquid waste to be pumped out of the wet-well.

20. A method for preventing formation of a solid or semi-solid surface layer in waste liquid, the method comprising the steps of:

providing a wet-well configured to accumulate the waste liquid;

indicating to a controller that a level of the waste liquid in the wet-well has reached a predetermined height;

injecting air into a bottom portion of the wet-well for a predetermined period of time in response to the controller receiving the indication that the waste liquid has reached the predetermined height, the injection of the air causing turbulent rotation of the liquid waste, the turbulent rotation disrupting and breaking up accumulated solids on a surface of the liquid waste to prevent the formation of the solid or semi-solid surface layer;

halting injection of the air for a predetermined period of time prior to activation of the liquid pump; and pumping a portion of the liquid waste out of the wet-well after the injection of has been halted.

* * * * *